US009696936B2

(12) United States Patent
Aronovich

(10) Patent No.: US 9,696,936 B2
(45) Date of Patent: *Jul. 4, 2017

(54) APPLYING A MAXIMUM SIZE BOUND ON CONTENT DEFINED SEGMENTATION OF DATA

(71) Applicant: INTERNATIONAL BUSINESS MACHINES CORPORATION, Armonk, NY (US)

(72) Inventor: Lior Aronovich, Thornhill (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/069,054

(22) Filed: Mar. 14, 2016

(65) Prior Publication Data
US 2016/0266840 A1 Sep. 15, 2016

Related U.S. Application Data

(63) Continuation of application No. 13/942,009, filed on Jul. 15, 2013, now Pat. No. 9,286,314.

(51) Int. Cl.
G06F 12/00 (2006.01)
G06F 3/06 (2006.01)
(Continued)

(52) U.S. Cl.
CPC .......... G06F 3/0641 (2013.01); G06F 3/0608 (2013.01); G06F 3/0629 (2013.01);
(Continued)

(58) Field of Classification Search
None
See application file for complete search history.

(56) References Cited

U.S. PATENT DOCUMENTS 5,990,810 A 11/1999 Williams
6,810,398 B2 10/2004 Moulton
(Continued)

FOREIGN PATENT DOCUMENTS

WO 2012092348 A2 7/2012
WO 2012158654 A2 11/2012

OTHER PUBLICATIONS

Bhagwat et al., "Extreme Binning: Scalable, Parallel Deduplication for Chunk-based File Backup," Proceedings of the 17th IEEE/ACM International Symposium on Modeling, Analysis and Simulation of Computer and Telecommunications Systems (MASCOTS'2009), London, UK, Sep. 2009 (9 pages).
(Continued)

Primary Examiner — Midys Rojas
(74) Attorney, Agent, or Firm — Griffiths & Seaton PLLC

(57) ABSTRACT

Applying a content defined maximum size bound on blocks produced by content defined segmentation of data by calculating the size of the interval of data between a newly found candidate segmenting position and a last candidate segmenting position of the same or higher hierarchy level, and then using the intermediate candidate segmenting positions of that interval if the size of the interval exceeds the maximum size bound, or discarding the intermediate candidate segmenting positions of that interval if the size of the interval does not exceed the maximum size bound.

22 Claims, 7 Drawing Sheets

(51) Int. Cl.
*G06F 17/30* (2006.01)
*G06F 12/06* (2006.01)
*G06F 11/14* (2006.01)

(52) U.S. Cl.
CPC .......... *G06F 3/0644* (2013.01); *G06F 3/0671* (2013.01); *G06F 3/0683* (2013.01); *G06F 11/1435* (2013.01); *G06F 12/00* (2013.01); *G06F 12/06* (2013.01); *G06F 17/30097* (2013.01); *G06F 17/30159* (2013.01)

(56) References Cited

U.S. PATENT DOCUMENTS

| | | |
|---|---|---|
| 7,523,098 B2 | 4/2009 | Hirsch et al. |
| 7,694,191 B1 | 4/2010 | Bono et al. |
| 8,108,353 B2 | 1/2012 | Balachandran et al. |
| 8,200,923 B1 | 6/2012 | Healy et al. |
| 8,285,957 B1 | 10/2012 | Nag et al. |
| 8,412,848 B2 | 4/2013 | Therrien et al. |
| 2008/0013830 A1 | 1/2008 | Patterson et al. |
| 2009/0307251 A1 | 12/2009 | Heller et al. |
| 2010/0088277 A1 | 4/2010 | Rao et al. |
| 2010/0088349 A1 | 4/2010 | Parab |
| 2010/0198797 A1 | 8/2010 | Wideman |
| 2011/0016095 A1 | 1/2011 | Anglin et al. |
| 2012/0023070 A1 | 1/2012 | Prahlad et al. |
| 2012/0023112 A1 | 1/2012 | Levow et al. |
| 2012/0166448 A1 | 6/2012 | Li et al. |
| 2012/0226697 A1 | 9/2012 | Chang et al. |
| 2012/0239625 A1 | 9/2012 | Aronovich et al. |
| 2012/0259825 A1 | 10/2012 | Tashiro et al. |
| 2013/0018854 A1 | 1/2013 | Condict |

OTHER PUBLICATIONS

Zhu et al., "Avoiding the disk bottleneck in the Data Domain deduplication file system," in Proceedings of the 6th USENIX Conference on File and Storage Technologies (FAST), USENIX Association, San Jose, CA, USA, pp. 269-282, Feb. 2008 (14 pages).

Romanski et al., "Anchor-driven subchunk deduplication," in Proceedings of the 4th Annual International Conference on Systems and Storage (SYSTOR '11), ACM, Article 16, New York, NY, USA (13 pages).

Muthitacharoen et al., "A low-bandwidth network file system," in Proceedings of the 18th ACM Symposium on Operating Systems Principles (SOSP), ACM Press, Banff, Alberta, Canada, pp. 174-187, Oct. 2001 (1 page).

Cai et al., "Research on Chunking Algorithms of Data De-Duplication," American Journal of Engineering and Technology Research, vol. 11, No. 9, 2011 (1 page).

Lillibridge et al., "Sparse Indexing: Large Scale, Inline Deduplication Using Sampling and Locality," Proceedings of the 8th Conference on File and Storage Technologies (FAST), USENIX, pp. 111-123, 2009 (13 pages).

Anonymous, "Framework for Stream De-duplication using Biased Reservoir-Sampling," http://priorartdatabase.com/IPCOM/000216344, Mar. 31, 2012 (7 pages).

APPLYING A MAXIMUM SIZE BOUND ON CONTENT DEFINED SEGMENTATION OF DATA

CROSS REFERENCE TO RELATED APPLICATIONS

This application is a Continuation of U.S. patent application Ser. No. 13/942,009, which is cross-related to the following seventeen applications: U.S. application Ser. No. 13/941,703, U.S. application Ser. No. 13/941,873, U.S. application Ser. No. 13/941,694, U.S. application Ser. No. 13/941,886, U.S. application Ser. No. 13/941,896, U.S. application Ser. No. 13/941,951, U.S. application Ser. No. 13/941,711, U.S. application Ser. No. 13/941,958, U.S. application Ser. No. 13/941,714, U.S. application Ser. No. 13/941,742, U.S. application Ser. No. 13/941,769, U.S. application Ser. No. 13/941,782, U.S. application Ser. No. 13/941,982, U.S. application Ser. No. 13/941,800, U.S. application Ser. No. 13/941,999, U.S. Pat. No. 9,268,786, and U.S. Pat. No. 9,244,830, all of which are filed Jul. 15, 2013, and the entire contents of which are incorporated herein by reference and are relied upon for claiming the benefit of priority.

BACKGROUND OF THE INVENTION

Field of the Invention

The present invention relates in general to computers, and more particularly to applying a maximum size bound on content defined segmentation of data in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of the available data are copied again and again, by locating repeated data and storing only its first occurrence. Subsequent copies are replaced with pointers to the stored occurrence, which significantly reduces the storage requirements if the data is indeed repetitive.

SUMMARY OF THE DESCRIBED EMBODIMENTS

In one embodiment, a method is provided for applying a content defined maximum size bound on content defined blocks in a data deduplication system using a processor device in a computing environment. In one embodiment, by way of example only, the method includes defining a plurality of segmenting probabilities and a plurality of segmenting conditions; ordering the plurality of segmenting conditions in accordance with the associated one of the plurality of segmenting probabilities to form a hierarchy of the plurality of segmenting conditions; defining a segmenting condition associated with a highest segmenting probability to be a lowest level segmenting condition in the hierarchy of the plurality of segmenting conditions, and defining the segmenting condition associated with a lowest segmenting probability to be a highest level segmenting condition in the hierarchy of the plurality of segmenting conditions; defining a maximum bound on a size of a block; calculating a plurality of hash values for each seed block in each consecutive byte position in the data; evaluating each one of the plurality of hash values using the plurality of segmenting conditions; determining a position of one of the plurality of hash values as a candidate segmenting position in the data if at least one of the plurality of segmenting conditions is satisfied by the hash value; defining a hierarchy level of a candidate segmenting position as the hierarchy level of the highest level segmenting condition that is satisfied by the one of the plurality of hash values of the candidate segmenting position; and recording candidate segmenting positions with hierarchy levels of the candidate segmenting positions.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
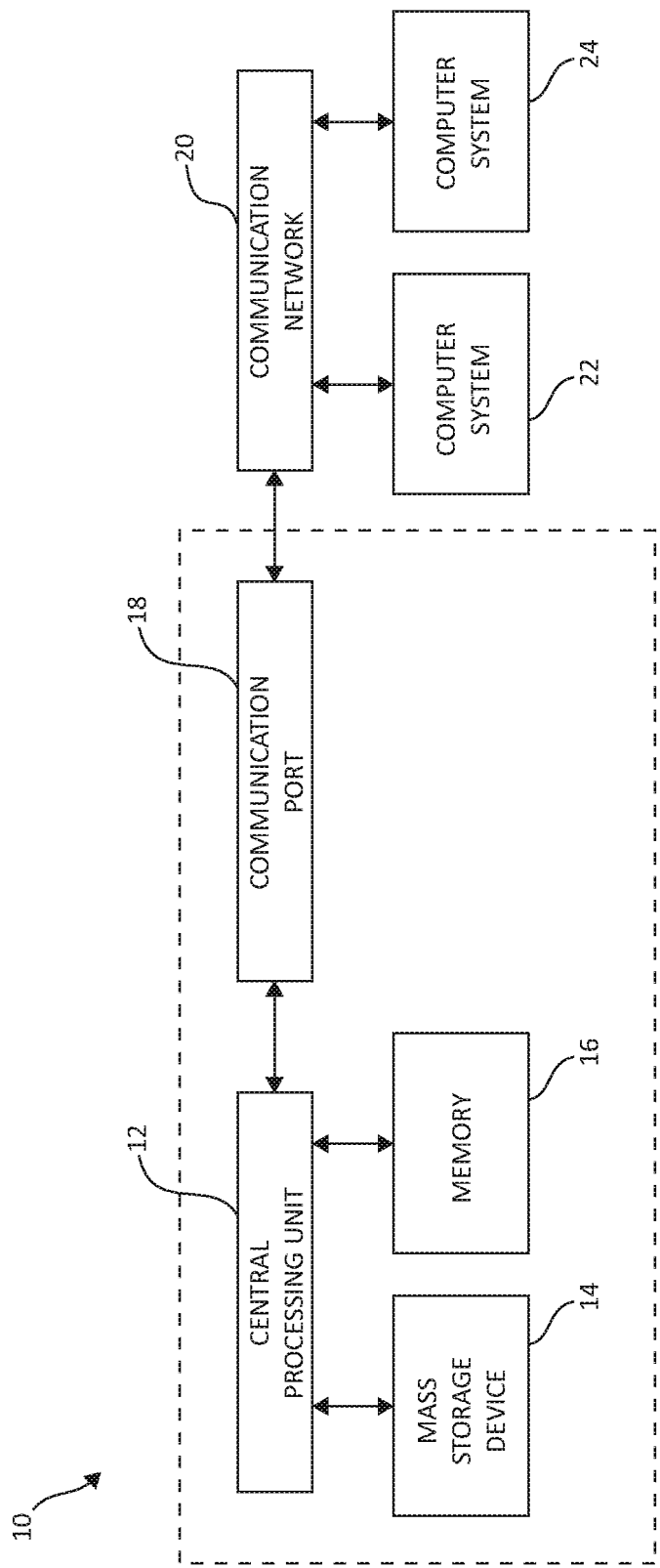
FIG. 1 is a block diagram illustrating a computing system environment having an example storage device in which aspects of the present invention may be realized.

Data deduplication is a highly important and vibrant field in computing storage systems. Data deduplication refers to the reduction and/or elimination of redundant data. In data deduplication, a data object, which may be a file, a data stream, or some other form of data, is partitioned into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicate data, and the challenges in achieving this goal are efficiently finding the duplicate data patterns in a typically large repository, and storing the data patterns in a storage efficient deduplicated form. In one embodiment, a fundamental technique underlying deduplication storage systems is a method of segmenting the data into variable sized blocks (e.g. of mean sizes ranging from 4 KB to 64 KB), where the blocks' boundaries are dependent on the data itself. After segmenting the data into such blocks, identification values known as digests or fingerprints are associated with each block of data. The digest values are commonly cryptographic hash values calculated based on the blocks' data. Functions that are widely used are cryptographic hash functions, such as the Secure Hash Algorithm (SHA) family of functions, e.g. SHA-1 or SHA-256, and the size of a digest value typically ranges from 16 bytes to 64 bytes. Then, given new input data, the digest values of the input data are searched in a repository to find matching digest values of data already stored in the repository. This enables to identify data matches, and achieve data deduplication.

In one embodiment, a main benefit of having the blocks' boundaries dependent on the data itself is that such segmentations are robust to changes in the data, specifically insertions and deletions. Namely, if the data is segmented in a way that is not data dependent (e.g. fixed size blocks), then an insertion or deletion of even a single byte somewhere in the data will change the contents of many of the data blocks and therefore change their respective digest (hash) values, thus considerably reducing deduplication effectiveness. If, on the other hand, the blocks' boundaries depend on the data itself, then insertions and deletions affect only a local range of blocks encompassing these modifications, thus enabling effective deduplication.

In one embodiment, techniques of determining blocks' boundaries based on the data are termed as "Content Defined Chunking" or CDC techniques. In one embodiment, these techniques are fundamental to data deduplication systems, and may also be used in many other fields, such as network bandwidth reduction, replication, remote data synchronization, and contents analysis.

However, one of the challenges with existing CDC techniques is that their segmentation results are affected by the specific high level partition applied on the data. Namely, different high level partitions of the data will cause existing CDC techniques to produce different segmentations for the same data (the extent of difference varies between the methods). These differences reduce the effectiveness of deduplication. In one embodiment of a deduplication system, the data is partitioned into high level 16 MB chunks, and then segmentation into blocks is done within each chunk. Some CDC techniques apply segmentation conditions, which include a consideration of the distance from the position in the data where the segmentation processing starts. For example, such a consideration can be that the probability for satisfying a segmenting condition increases as the distance from the starting position of the processing unit increases. Another consideration can be avoidance of searching for a segmenting boundary within a predetermined minimum distance from the starting position of the processing unit. Such segmentation conditions increase the sensitivity of these CDC techniques to the high level partition of the data. Other CDC methods consider a set of positions (instead of a single position) in calculating the segmentation condition. Since different high level partitions of the data may affect the composition of sets of positions, this again increases the sensitivity of these CDC techniques to the high level partition of the data. The result of these dependencies is that different high level partitions of the data can cause a segmentation method to produce different segmentations for the same data. Moreover, since each segmenting position depends on the previous segmenting position, differences in the partitions can be carried forward over considerable length. This effect considerably reduces deduplication effectiveness, and can be prohibitive for large scale deduplication systems.

Furthermore, since existing methods are sensitive to the high level partition of the data, these methods cannot support parallel calculation of the blocks segmentation without further increasing their sensitivity to the data partition. In parallel calculation, the data is partitioned into processing units and segmentation is calculated for each processing unit independently and in parallel to other processing units. Since with existing segmentation methods, the partition to processing units affects and modifies their segmentation results, these methods cannot support parallel calculation of segmentation without reducing the effectiveness of deduplication.

An additional challenge in existing CDC techniques is that many existing techniques do not apply a minimum bound and a maximum bound on the block sizes. A minimum bound is required for facilitating efficient storage of the blocks' information, because if there is no minimum bound then a block size can be very small, thus possibly producing an increased amount of blocks, and increasing the storage size that should be allocated for storing the blocks' information. A maximum bound is required to improve the deduplication effectiveness, because large blocks increase the loss of deduplication resulting from modifications in the data, as any change in the data of a block also probabilistically changes the digest value of the block. In addition, applying minimum and maximum size bounds reduces the variance of the block sizes, which increases the effectiveness of deduplication. Existing methods that apply a minimum bound on the block sizes commonly increase the sensitivity of their segmentation results to the high level partition of the data. Existing methods that apply a maximum bound on the block sizes commonly apply a maximum bound which is arbitrary and not data dependent, thus reducing the effectiveness of deduplication.

Some of the existing CDC techniques have several algorithmic parameters with a large space of possible parameter values. For such methods, the effects, or the extents of the effects, of the parameters' values can be unclear, and can require experimental tuning. Moreover, the effects of parameters' values may depend on the properties of the workloads being processed, causing the prediction of these effects to be difficult, and making the scheme complex for tuning, requiring different values for different workloads.

The challenges of existing CDC techniques specified above cause existing techniques to be inappropriate for the requirements of large-scale and high-end deduplication systems, hence a new segmentation algorithm is required to overcome these challenges. The present invention seeks to provide a solution to these challenges by providing a new segmentation algorithm designed based on the following goals. 1) The output segmentation of the algorithm should be independent of the high level partition of the data. Namely, the algorithm should provide the same output segmentation for the same data, independently of the high level partition of the data. 2) The algorithm should support parallel calculation of block segmentation, to increase efficiency and performance. 3) The algorithm should apply data dependent maximum and minimum size bounds on the generated blocks. The segmenting positions generated by the application of the maximum and minimum size bounds should be data dependent, as well as independent of the effects of high level partition. 4) The algorithm should be general in terms of not requiring tuning for specific workload types. To facilitate this, the algorithm should have no more than a few clear to understand parameters, with limited ranges of values and predictable effects.

In one embodiment, the present invention calculates a rolling hash value for each seed (a seed is a small fixed sized block of data of e.g. 64 bytes) at each byte position in the data. The size of a rolling hash value may be for example 8 bytes. Block boundaries are calculated based on the rolling hash values, by evaluating a segmenting condition, as elaborated in the following. A key idea underlying the algorithm of the present invention is that each rolling hash value is evaluated using the segmenting condition independently of other rolling hash values. In other words, the algorithm is stateless in evaluating a rolling hash value using the segmenting condition. The reason for this is that this enables the segmentation results of the algorithm to be independent of the high level partition of the data. Such high level partition (as specified previously) can originate from partitioning of the data into high level chunks or/and into parallel processing units. If, by contrast, evaluation of a rolling hash value using the segmenting condition is affected also by a state maintained by the algorithm, which depends on previous rolling hash values, or if a set of rolling hash values are evaluated together using the segmenting condition, then this causes the output segmentation to be considerably more dependent on the high level partition of the data. This is because the high level partition affects the grouping of the rolling hash values. Therefore, by designing the algorithm to be stateless, by evaluating only individual rolling hash values independently, the segmentation results of the algorithm become independent of the high level partition of the data.

A further main key idea underlying the algorithm of the present invention is a novel design of hierarchical segmentation conditions. In one embodiment, by way of example only, each condition on the hierarchy is associated with a specific segmenting probability, such that a condition with a lower segmenting probability is higher on the hierarchy. The reason is that a lower segmenting probability produces segmenting positions, which are more statistically significant. The main benefit of introducing a hierarchy of segmenting probabilities and associated segmenting conditions is that this model enables the algorithm to select and apply an appropriate segmenting probability for specific sections in the data where the highest level segmenting condition does not produce a segmenting position. Sections in the data that are characterized by frequent recurrence of specific patterns can cause inability to produce a highest level segmenting position, and for such sections the algorithm of this invention selects the best alternative segmentation probability to produce optimal segmentation. The segmenting conditions are designed such that if a hash value satisfies a specific segmenting condition, then that hash value also satisfies all the segmenting conditions which are of lower level on the hierarchy than that segmenting condition; and if a hash value does not satisfy a specific segmenting condition, then that hash value also does not satisfy the segmenting conditions which are of higher level on the hierarchy than that segmenting condition.

In one embodiment, the algorithm of the present invention applies a maximum bound on the size of the produced blocks, such that the segmenting positions produced by applying the maximum size bound are data dependent. This is in contrast to existing methods that apply a maximum size bound by applying arbitrary segmenting positions, which are not data dependent, thus reducing the effectiveness of deduplication. By applying a maximum size bound, which is data dependent, by the algorithm of the present invention, the deduplication effectiveness is considerably increased. Generally, a maximum size bound is required to improve the deduplication effectiveness, because large blocks increase the loss of deduplication resulting from modifications in the data, as any change in the data of a block also probabilistically changes the digest value of the block. In addition, applying a maximum size bound helps in reducing the variance of the block sizes, and reducing this variance increases the effectiveness of deduplication.

As described herein, to apply a data dependent maximum size bound the algorithm of the present invention calculates the size of the interval of data between a newly found candidate segmenting position and a last candidate segmenting position of the same or higher hierarchy level, and if the size of the interval exceeds the maximum size bound the algorithm uses candidate segmenting positions of lower hierarchy level to segment that interval. Cases where the size of an interval exceeds the maximum bound occur where there is frequent recurrence of specific characters or data patterns in an interval of data, which causes a reduction in the numeric range of the rolling hash values. The algorithm of the present invention identifies this and applies segmenting positions of a lower hierarchy level for segmenting such intervals. The hierarchy level determined by the algorithm is selected dynamically to be the highest possible hierarchy level for the specific interval of data. If the size of the interval does not exceed the maximum bound then the candidate segmenting positions of lower hierarchy level on the interval are discarded.

In one embodiment, the algorithm of the present invention applies a minimum bound on the size of the produced blocks, which is data dependent, and does not increase the sensitivity of the produced segmentation to the high level partition of the data. A minimum size bound is required for facilitating efficient storage of blocks' information, because if there is no minimum size bound then a block size can be very small, thus entailing an increased amount of storage that should be allocated for storing the block's information. In addition, applying a minimum size bound helps in reducing the variance of the block sizes, which increases the effectiveness of deduplication. Many existing methods do not apply a minimum size bound; and those which do apply a minimum bound, increase the sensitivity of their segmentation results to the high level partition of the data, because applying a minimum size bound adds a state to the processing.

In one embodiment, the algorithm of the present invention applies a minimum size bound only in cases where there is a confirmed previous segmenting position, in order to minimize sensitivity to the high level partition of the data. The algorithm of the present invention calculates the size of the interval of data between a newly found candidate segmenting position and a last candidate segmenting position of the same or higher hierarchy level, and only if the size of the interval of data is lower than the minimum size bound, the algorithm discards the newly found candidate segmenting position. However, if there is no last candidate segmenting position of the same or higher hierarchy level (e.g. at the beginning of a processing unit or a high level chunk), or if the size of the interval is not lower than the minimum size bound, then the algorithm retains a newly found candidate segmenting position. In the first case, when a last candidate segmenting position of a same or higher hierarchy level becomes available (e.g. in case of concurrent calculation units of segmenting positions), the evaluation is reiterated to converge the edge segmenting positions of the outputs of consecutive calculation units.

In addition, the algorithm of the present invention has very few parameters, and the effects of these parameters are predictable. Thus, the algorithm is general in the sense that it does not require tuning for specifics workload types. In one embodiment, the present invention solves several fundamental problems of existing CDC methods. First, it produces output segmentations that are independent of any high level partition of the data. Second, it supports parallel calculation of block segmentation, thus increasing efficiency and performance. Third, it applies content defined maximum and minimum size bounds on the generated blocks, which are also independent of the effects of high level partition. Fourth, it is general and does not require tuning for specific workload types.

In one embodiment, the present invention provides a solution for segmenting data into variable size blocks based on content defined positions in a data deduplication system using a processor device in a computing environment. In one embodiment, by way of example only, segmenting probabilities and associated segmenting conditions are defined, where each of the segmenting conditions is associated with one of the segmenting probabilities. The segmenting conditions are ordered in accordance with their associated segmenting probabilities to form a hierarchy of the segmenting conditions. The segmenting condition associated with a highest segmenting probability is defined to be a lowest level segmenting condition in the hierarchy of the segmenting conditions, and the segmenting condition associated with a lowest segmenting probability is defined to be a highest level segmenting condition in the hierarchy of the segmenting conditions. Hash values are calculated for each seed block in each consecutive byte position in the data. Each one of the hash values is evaluated using the segmenting conditions. A segmenting position is determined in the data for each hash value that satisfies one of the segmenting conditions.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
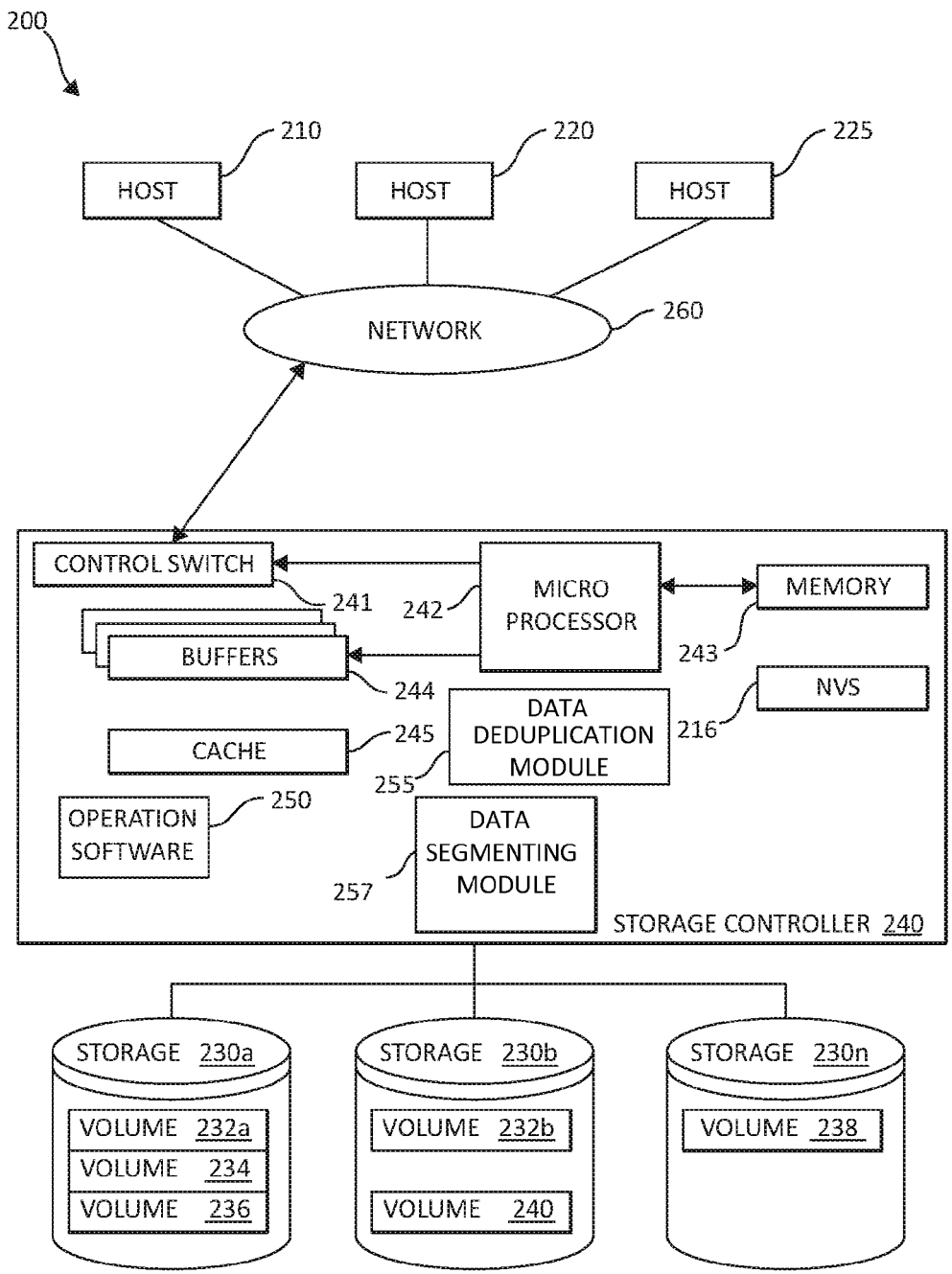
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data duplication module 255 and a data segmenting module 257. The data duplication module 255 and the data segmenting module 257 may work in conjunction with each and every component of the storage controller 240, the hosts 210, 220, 225, and storage devices 230. The data duplication module 255 and the data segmenting module 257 may be structurally one complete module or may be associated and/or included with other individual modules. The data duplication module 255 and the data segmenting module 257 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data duplication module 255 and/or the data segmenting module 257, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, data duplication module 255 and the data segmenting module 257 are in communication with each other and may be separate or one individual component(s). Also, several, if not all of the components, such as the operation software 250 may be included with the memory 243. Each of the components within the devices shown may be linked together and may be in communication with each other for purposes suited to the present invention. As mentioned above, the data duplication module 255 and the data segmenting module 257 may also be located in the cache 245 or other components. As such, the data duplication module 255 and the data segmenting module 257 maybe used as needed, based upon the storage architecture and users preferences.

In one embodiment, the algorithm of the present invention evaluates each rolling hash value independently using the segmenting conditions, in search for a segmenting position. Generally, the segmenting conditions are designed based on the following form: [Rolling hash value] modulo [Divisor] =[Residue], where the Divisor and Residue values are predefined, and 0<=[Residue]<[Divisor]. When the hash values are random and are uniformly distributed over their full numeric space, the above segmenting condition is satisfied in accordance with the probability $P_s=1/[\text{Divisor}]$. The probability for not satisfying the above segmenting condition after scanning M random hash values is: $P_n(M)=(1-P_s)^M=(1-(1/[\text{Divisor}]))^M$. For example, for a 1K Divisor $P_s=1/1024$. Therefore: $P_n(1K)=0.3677$; $P_n(2K)=0.1352$; $P_n(4K)=0.0183$; $P_n(8K)=0.0003$. So, for a 1K Divisor, 8K can be a reasonable maximum bound on the number of hash values to scan for finding a segmenting position.

However, there may be sections of data where the numeric space of the generated hash values is limited. This occurs in sections where specific patterns of data or specific characters appear in a sequence or recur frequently. In cases of a sequence of a specific character, also referred to as a "run", a single rolling hash value is produced for most of the length of the run. A limited numeric space of the rolling hash values increases the probability of not satisfying the segmenting condition within the maximum size bound, relative to data without such recurrences.

Figure 3:
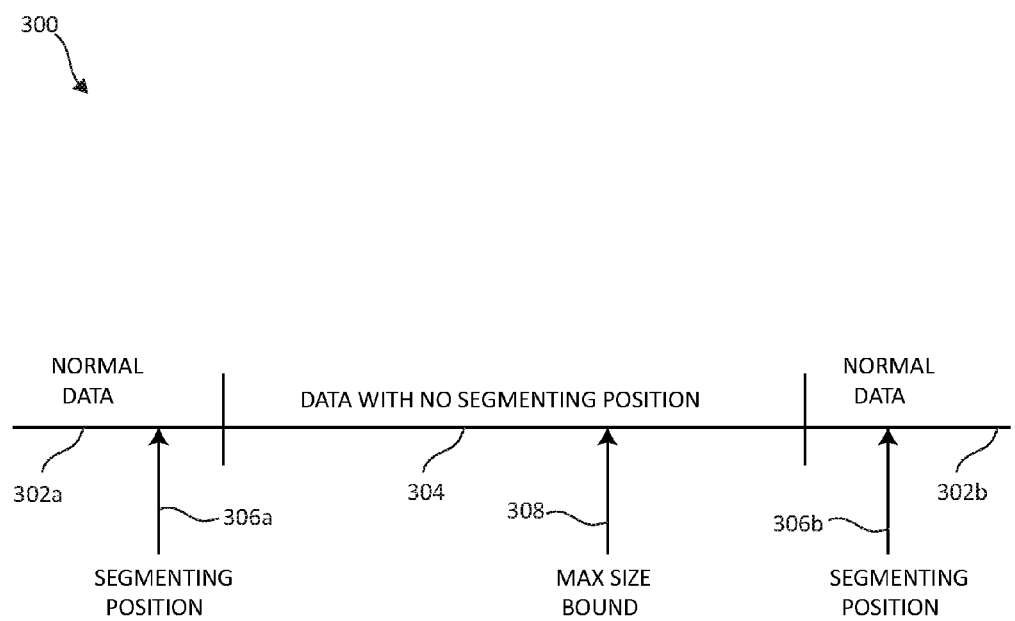
FIG. 3 is a block diagram illustrating an exemplary method for identifying a data interval for which a segmenting position was not found within the maximum size bound in which aspects of the present invention may be realized.

Turning now to FIG. 3 is a block diagram 300 illustrating an exemplary method for identifying a data interval for which a segmenting position was not found within the maximum size bound in which aspects of the present invention may be realized. In one embodiment, the algorithm of the present invention identifies a data interval 304 for which a segmenting position was not found within the maximum size bound 308, by identifying that the size of the interval 304 between two already determined segmenting positions 306a and 306b within normal data 302a and 302b exceeds the maximum size bound 308, defined based on the segmenting probability $P_s$ (e.g. 8K values in the example above). This is by contrast to other techniques, which consider the distance between a previous segmenting position and the current position in the scan, where the current position in the scan is not a data dependent segmenting position and is arbitrary.

In one embodiment, to provide quality data dependent segmenting positions for data intervals exceeding the maximum size bound (i.e. for which segmenting positions were not found), the algorithm of the present invention uses a set of additional segmenting conditions having segmenting probabilities which are higher than the main segmenting probability used. These additional segmenting conditions are evaluated in the same calculation of evaluating the main segmenting condition. While the additional segmenting conditions are more likely to produce segmenting positions in a given interval of data, relative to the main segmenting condition, since these additional segmenting conditions have higher segmenting probabilities their produced segmenting positions are statistically less significant. Therefore, the algorithm of the present invention selects the segmenting positions produced by the lowest segmenting probability that generated segmenting positions for the data interval being processed. In one embodiment of the present invention, by way of example, 4 segmenting probabilities may be defined: 1/1024, 1/256, 1/128, and 1/64.

In cases of runs of an individual character, the produced rolling hash values are identical throughout most of the length of the run. In such cases, even the highest segmenting probability defined will probabilistically not produce a segmenting position. Therefore, a case where all the segmenting probabilities did not produce a segmenting position in an interval of data whose size exceeds the maximum size bound, is handled by the algorithm of the present invention by applying a fixed size segmentation to that data interval. Since there is sufficiently high probability that such an interval of data consists of a run, the fixed size segmentation produces with high probability blocks of identical size, identical contents and an identical digest value, which enable effective deduplication of this data.

In one embodiment, to apply varying segmentation probabilities, two types of segmenting conditions are introduced. The first type is denoted as 'Varying modulo results', and includes a first (highest hierarchy level) condition as follows: ([Hash value] & ([Divisor]−1))=[Residue]; and includes the following (lower hierarchy level) conditions: ([Hash value]& ([Divisor]−1))<([Divisor]/[Target inverse probability]). In one embodiment, the second type is denoted as 'Varying modulo divisors', and includes a first (highest hierarchy level) condition as follows:

([Hash value]& ([Divisor]−1))=[Residue]; and includes the following (lower hierarchy level) conditions: ([Hash value]& ([Target inverse probability]−1))=[Residue].

Usage of the bitwise and operator in the conditions above produces a modulo result assuming that the divisor is a power of 2. It is also assumed that the target inverse probabilities are all power of 2 values. So the 'Varying modulo results' conditions are equivalent to:

([Hash value] modulo [Divisor])=[Residue]; and ([Hash value] modulo [Divisor])<([Divisor]/[Target inverse probability]);

and the 'Varying modulo divisors' conditions are equivalent to:

([Hash value] modulo [Divisor])=[Residue]; and ([Hash value] modulo [Target inverse probability])= [Residue].

The Divisor value can be for example 1024, and the Target inverse probability values used in the lower hierarchy level conditions can be for example: 256, 128, 64. This is assuming that 4 levels of probabilities are defined; but there may be more probabilities or fewer probabilities defined. These example values yield that, for both types of segmenting conditions, the first condition yields a segmenting probability of 1/1024, and the following segmenting conditions yield the following segmenting probabilities: 1/256, 1/128, 1/64.

Both types of segmenting conditions are designed to be hierarchical, namely if a position is a segmenting position by a specific condition on the hierarchy, then that position is also a segmenting position by the conditions which are lower on the hierarchy, i.e. with higher segmenting probabilities, than that condition. The hierarchical structure is achieved by the following properties:

(a) The [Divisor] value and [Target inverse probabilities] values are all power of 2 values;
(b) [Divisor]>[Target inverse probability]$_1$> . . . >[Target inverse probability]$_T$, where there are T target inverse probabilities;
(c) [Residue]<MIN{[Divisor]/[Target inverse probability]$_{i=1\ldots T}$} for the first type of conditions; and [Residue] <MIN{[Target inverse probability]=$_{i=1\ldots T}$} for the second type of conditions.

Because of the hierarchy property of the segmenting conditions, it also applies that if a position is not a segmenting position by a specific condition on the hierarchy, then that position is also not a segmenting position by the conditions, which are higher on the hierarchy, i.e. with lower segmenting probabilities, than that condition. Therefore, it is efficient that for each position (namely for each rolling hash value), the segmenting conditions will be evaluated in an order from the lowest hierarchy level (highest segmenting probability) condition to the highest hierarchy level (lowest segmenting probability) condition. The reason is that most hash values do not satisfy any of the segmenting conditions, and so evaluating first the lowest hierarchy level condition enables to avoid evaluation of the rest of the conditions for most of the hash values. It is further noted that all the elements in the segmenting conditions specified above, except the hash value, are predefined constants, known at compile time, and therefore the calculation of these conditions is fast and optimized by the compiler.

In one embodiment, the algorithm of the present invention scans the rolling hash values linearly, and evaluates the segmenting conditions for each rolling hash value, starting with the lowest hierarchy level (highest segmenting probability) condition, and continuing to higher hierarchy level (lower segmenting probability) conditions, as long as the previous lower hierarchy level condition was satisfied. The evaluation stops at the first segmenting condition on the hierarchy which is not satisfied, identifying the highest level condition on the hierarchy that was satisfied. If the condition lowest on the hierarchy is not satisfied, then the hash value being evaluated is not a segmenting hash value and does not signify a segmenting position. If at least one of the segmenting conditions is satisfied by the hash value, then the hash value being evaluated is a segmenting hash value, signifying a segmenting position, and assigned with the hierarchy level of the highest level condition that has been satisfied by that hash value.

In one embodiment, the algorithm of the present invention performs a linear scan of the rolling hash values, and does not backtrack. Segmenting positions of lower hierarchy levels are recorded in memory by the algorithm, and actually used only if the distance between two consecutive segmenting positions produced by higher hierarchy level conditions exceeds the maximum size bound.

In one embodiment, the algorithm of the present invention applies a minimum bound and a maximum bound on the sizes of the produced blocks, such that the results are independent of the high level partition of the data, and the segmenting positions (i.e. blocks' boundaries) are always data dependent. The calculations and operations of the algorithm which are related to the minimum and maximum size bounds are performed based on already found two consecutive segmenting positions. This is unique to the algorithm of the present invention, and different from existing algorithms, which apply such calculations based on arbitrary positions, i.e. positions that are not data dependent. In the algorithm of the present invention, a newly found segmenting position is compared to the last segmenting position, which is of the same or higher hierarchy level (namely not necessarily compared to the actual last segmenting position found, as it may not be of the same or higher hierarchy level).

Application of the minimum size bound is achieved by using the following method: If the size of the data interval between a newly found segmenting position and the last segmenting position of the same or higher hierarchy level (as the newly found segmenting position), is smaller than the minimum size bound, then the newly found segmenting position is discarded. If, alternatively, there is no last segmenting position of the same or higher hierarchy level, or the size of the above interval is not smaller than the minimum size bound, then the newly found segmenting position is retained. If, further in the processing, a last segmenting position of the same or higher hierarchy level becomes available (e.g. in case of concurrent calculation of the segmenting positions), then the application of a minimum size bound is reiterated to converge the edge segmenting positions of the output segmentations of consecutive calculation units.

Application of the maximum size bound is achieved by using the following method: If the size of the data interval between a newly found segmenting position and the last segmenting position of the same or higher hierarchy level (as the newly found segmenting position), is larger than the maximum size bound, then the algorithm uses the lower hierarchy level segmenting positions recorded for the data interval to segment that interval. If, alternatively, the size of the interval is not larger than the maximum size bound, then the lower hierarchy level segmenting positions recorded for that interval are discarded.

Figure 4:
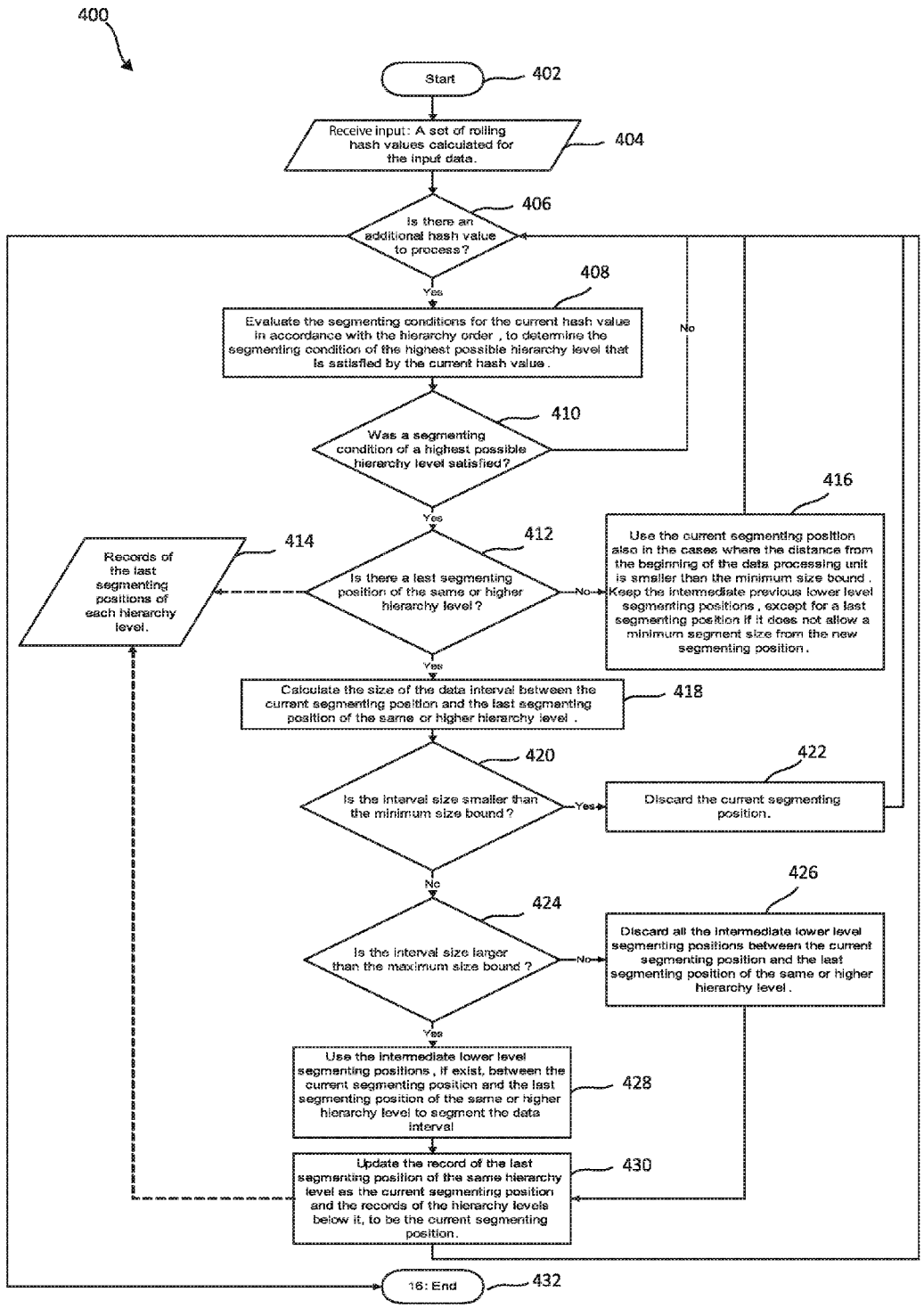
FIG. 4 is a flowchart illustrating an exemplary method for calculating hierarchical content defined segmentation in which aspects of the present invention may be realized.
Figure 5:
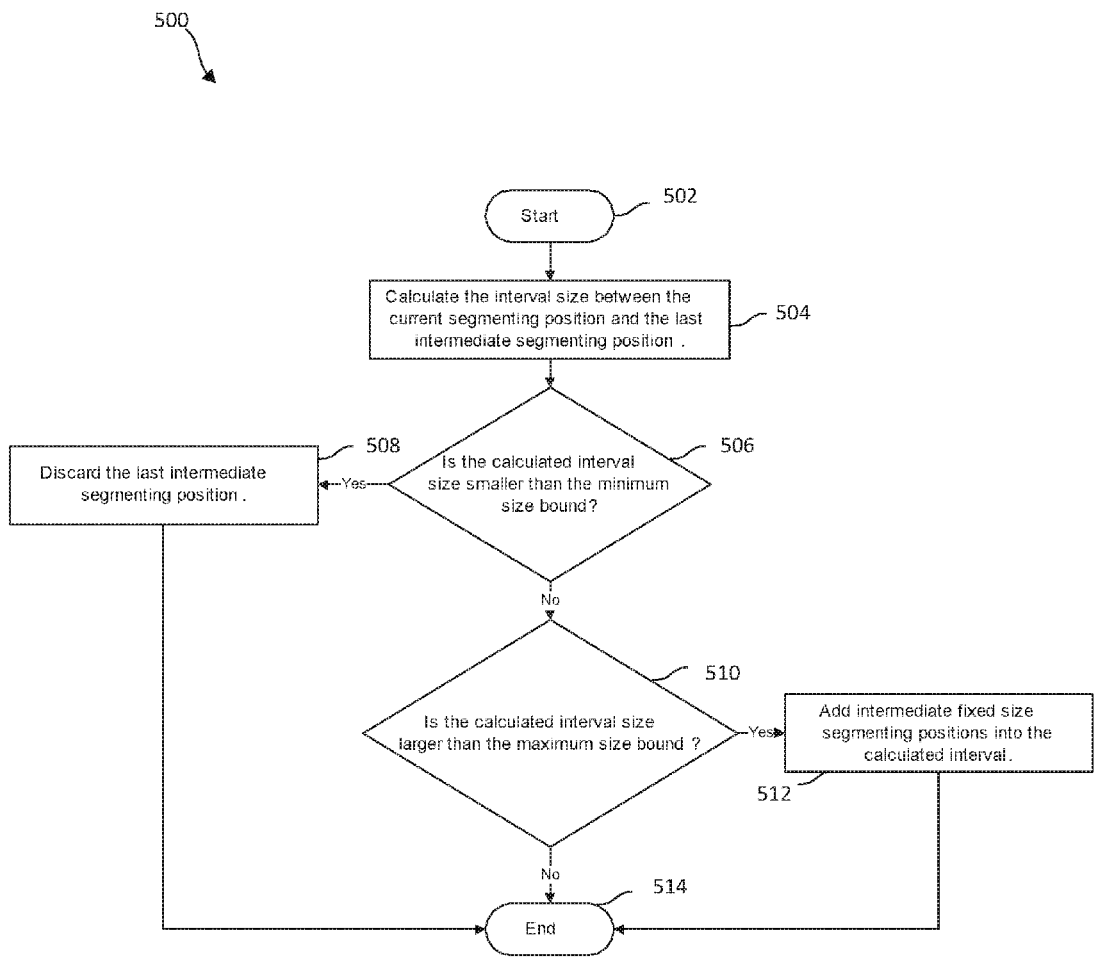
FIG. 5 is a flowchart illustrating an exemplary method for using intermediate segmenting positions in which aspects of the present invention may be realized.
Figure 6:
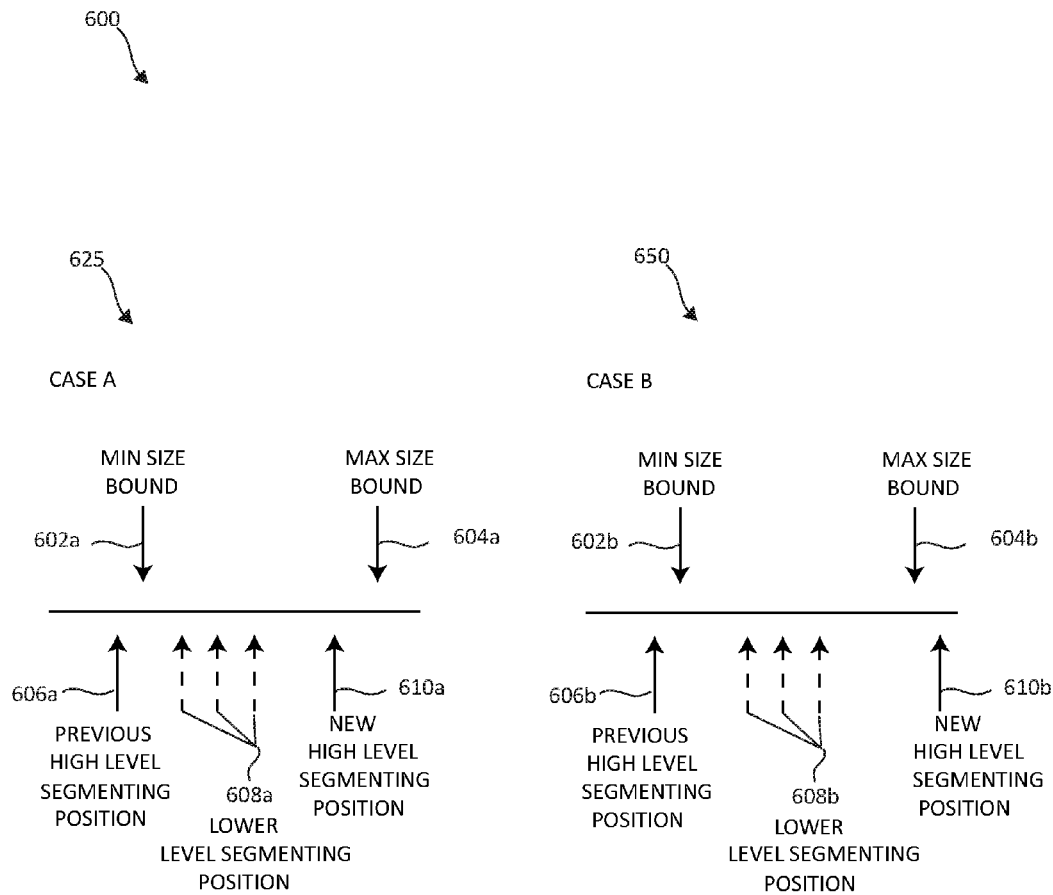
FIG. 6 is a block diagram illustrating usage of lower level segmenting positions to handle data that does not enable to produce high level segmenting positions in which aspects of the present invention may be realized.

Following, as illustrated in FIGS. 4, 5, and 6, the algorithm of the present invention for calculating hierarchical content defined segmentation of data into blocks is specified. Turning now first to FIG. 4, a flowchart illustrating an exemplary method for calculating hierarchical content defined segmentation of data into blocks in which aspects of the present invention may be realized is depicted. The method 400 begins (step 402), and receives an input that is a set of rolling hash values calculated for the input data (step 404). Each input hash value is processed individually by the method 400 determining if there are additional hash values to process (step 406). If there is no additional hash value to process, the method 400 ends (step 432). If there is an additional hash value to process, the method 400 proceeds to evaluate the segmenting conditions for the current hash value in accordance with the hierarchy order, as elaborated previously, to determine the segmenting condition of the highest possible hierarchy level that is satisfied by the current hash value (step 408). The method 400 checks if a condition of a highest possible hierarchy level was satisfied by the current hash value (step 410). If no, the method 400 returns to step 406. If yes, the algorithm checks if there is a last segmenting position of the same or higher hierarchy level (step 412). For this query, a data structure containing records of the last segmenting positions of each hierarchy level is queried (step 414). If yes, the method 400 calculates the size of the data interval between the current segmenting position and the last segmenting position of the same or higher hierarchy level (step 418). The method 400 checks if the interval size is smaller than the minimum size bound (step 420). If yes, the method 400 discards the current segmenting position (step 422) and returns to step 406. If no, the method 400 checks if the interval size is larger than the maximum size bound (step 424). If no (case (a) in FIG. 6), then all the intermediate lower level segmenting positions between the current segmenting position and the last segmenting position of the same or higher hierarchy level are discarded (step 426), and the method 400 proceeds to step 430. If yes (case [b] in FIG. 6), then the intermediate lower level segmenting positions, if exist, between the current segmenting position and the last segmenting position of the same or higher hierarchy level, are used to segment the data interval (step 428). The reason for using the intermediate lower level segmenting positions in this case is that these segmenting positions and their associated higher segmenting probabilities are better suited for segmenting the specific data in this interval. Further elaboration on step 428 is provided in FIG. 5. From both steps 428 and 426, the method 400 proceeds to update the record of the last segmenting position of the same hierarchy level as the current segmenting position and the records of the hierarchy levels below it, to be the current segmenting position (step 430), and then returns to step 406. Returning to step 412, if there is no last segmenting position of the same or higher hierarchy level (i.e. no last segmenting position to serve as reference), then the distance between the current segmenting position and the unknown last reference position is also unknown at this stage. Specifically, it is not known at this stage if that distance is lower than the minimum size bound, higher than the maximum size bound, or in between these bounds. Therefore, the method 400 proceeds to use the current segmenting position, also in the cases where the distance from the beginning of the data processing unit is smaller than the minimum size bound. Further calculation for the current segmenting position is applied when a last reference segmenting position becomes known and available. The method 400 also keeps the intermediate previous lower level segmenting positions, except for a last segmenting position if it does not allow a minimum segment size from the new segmenting position (step 416). The method 400 then returns to step 406.

FIG. 5 is a flowchart illustrating an exemplary method 500 for using intermediate segmenting positions in which aspects of the present invention may be realized. In FIG. 5, which expands step 428 in FIG. 4, the method 500 begins (step 502). The method 500 calculates the interval size between the current segmenting position and the last intermediate segmenting position (step 504). The method 500 then checks if the calculated interval size is smaller than the minimum size bound (step 506). If yes, the method 500 discards the last intermediate segmenting position (step 508), since this position does not allow a minimum interval size considering the new segmenting position. All previous segmenting positions have at least a minimum distance from the segmenting position that is being discarded, and thus also have at least a minimum distance from the new segmenting position. The method 500 then ends (step 514). If no, the method 500 checks if the calculated interval size is larger than the maximum size bound (step 510). If yes, the algorithm adds intermediate fixed size segmenting positions into the calculated interval (step 512), and then ends (step 514). If no, the method 500 ends (step 514).

To implement concurrent calculation of segmenting positions, the data is partitioned into concurrent calculation units. The sizes of the segmentation outputs of the concurrent calculation units are variable, however these sizes have a maximum bound, which is based on the minimum block size. In addition, the segmentation outputs of the concurrent calculation units have to be converged, since previous reference segmenting positions become available during the calculation.

FIG. 6 is a block diagram illustrating usage of lower level segmenting positions to handle data that does not enable to produce high level segmenting positions in which aspects of the present invention may be realized. As mentioned above, FIG. 6 illustrates case (a) 625 where the size of the data interval between the new high level segmenting position 610*a* and the previous high level segmenting position 606*a* is smaller than the maximum size bound 604*a*. In this case the intermediate lower level segmenting positions 608*a*, between the high level segmenting positions 606*a* and 610*a*, are discarded. The minimum size bound 602*a* is also illustrated. In case (b) 650, the size of the data interval between the new high level segmenting position 610*b* and the previous high level segmenting position 606*b* is larger than the maximum size bound 604*b*. In this case the intermediate lower level segmenting positions 608*b*, between the high level segmenting positions 606*b* and 610*b*, are used to segment the data interval between the high level segmenting positions 606*b* and 610*b*. The minimum size bound 602*b* is also illustrated.

Figure 7:
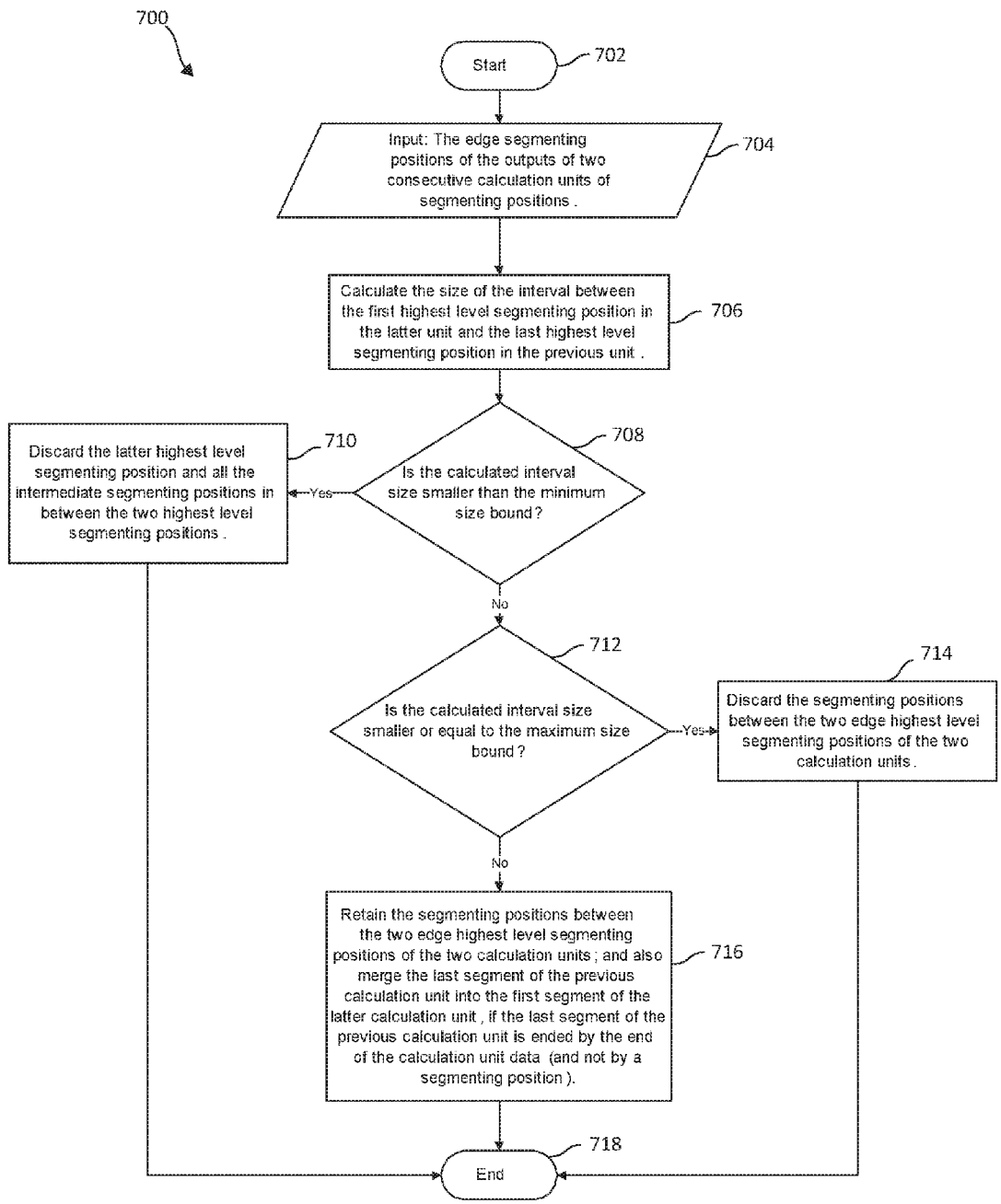
FIG. 7 is a flowchart illustrating an exemplary method for converging the segmentation outputs of consecutive calculation units of segmenting positions in which aspects of the present invention may be realized.

To converge the segmentation outputs of concurrent calculation units of the segmenting positions, the method specified in FIG. 7 is applied. FIG. 7 is a flowchart illustrating an exemplary method 700 for converging the segmentation outputs of consecutive calculation units of a concurrent calculation of segmenting positions in which aspects of the present invention may be realized. The method 700 begins (step 702) and inputs the edge segmenting positions of the outputs of two consecutive calculation units of segmenting positions (step 704). The method 700 calculates the size of the interval between the first highest level segmenting position in the latter unit and the last highest level segmenting position in the previous unit (step 706). The method 700 checks if the calculated interval size is smaller than the minimum size bound (step 708). If yes, the method 700 discards the latter highest level segmenting position and all the intermediate segmenting positions in between the two highest level segmenting positions (step 710), and then the method 700 ends (step 718). If no, the method 700 checks if the calculated interval size is smaller or equal to the maximum size bound (step 712). If yes, the method 700 discards the segmenting positions between the two edge highest level segmenting positions of the two calculation units (step 714), and then the method 700 ends (step 718). If no, the method 700 retains the segmenting positions between the two edge highest level segmenting positions of the two calculation units, and also merges the last segment of the previous calculation unit into the first segment of the latter calculation unit, if the last segment of the previous calculation unit is ended by the end of the calculation unit data (and not by a segmenting position) (step 716). The method 700 then ends (step 718).

In one embodiment, the present invention provides a solution for applying a content defined maximum size bound on content defined blocks in a data deduplication system using a processor device in a computing environment. In one embodiment, by way of example only, segmenting probabilities and segmenting conditions are defined where each of the segmenting conditions is associated with one of segmenting probabilities. Each one of the segmenting conditions is ordered in accordance with their associated segmenting probabilities to form a hierarchy of the segmenting conditions. A segmenting condition associated with a highest segmenting probability is defined to be a lowest level segmenting condition in the hierarchy of the segmenting conditions and the segmenting condition associated with a lowest segmenting probability is defined to be a highest level segmenting condition in the hierarchy of the segmenting conditions. A maximum bound on a size of a block is defined. Hash values are calculated for each seed block in each consecutive byte position in data. Each one of the hash values is evaluated using the segmenting conditions. A position of one of the hash values is determined as a candidate segmenting position in the data if at least one of the segmenting conditions is satisfied by the hash value. A hierarchy level of a candidate segmenting position is defined as the hierarchy level of the highest level segmenting condition that is satisfied by the one of the plurality of hash values of the candidate segmenting position. Candidate segmenting positions are recorded with hierarchy levels of the candidate segmenting positions. The size of the interval of data is calculated between a newly found candidate segmenting position and a previous candidate segmenting position. The candidate segmenting positions of the interval of data is determined to be actual segmenting positions if the size of the interval of data exceeds the maximum bound on the size of the block.

In one embodiment, the present invention defines the previous candidate segmenting position to be the last candidate segmenting position of a same or higher hierarchy level as the newly found candidate segmenting position.

In one embodiment, the present invention defines the candidate segmenting positions of the interval of data to be of lower hierarchy level than the newly found candidate segmenting position. In one embodiment, the present invention maintains for each level of hierarchy the last candidate segmenting position of the same or higher hierarchy level.

In one embodiment, the present invention discards candidate segmenting positions of the interval of data if the size of the interval of data does not exceed the maximum bound on the size of a block.

In one embodiment, the present invention applies segmentation of the interval of data to blocks of a predefined size, if the size of the interval of data exceeds the maximum bound on the size of a block and there are no candidate segmenting positions of the interval of data. The maximum bound on the size of a block is defined based on the lowest probability of segmentation.

In one embodiment, the present invention defines that if a hash value satisfies one of the segmenting conditions, then that hash value also satisfies the segmenting conditions which are of lower level on the hierarchy than the one segmenting condition; and further defining that if a hash value does not satisfy one of the segmenting conditions, then that hash value also does not satisfy the segmenting conditions which are of higher level on the hierarchy than the one segmenting condition.

In one embodiment, the present invention provides a solution for applying a content defined minimum size bound on content defined blocks in a data deduplication system using a processor device in a computing environment. In one embodiment, the present invention applies a content defined minimum size bound on blocks produced by content defined segmentation by calculating the size of the interval of data between a newly found candidate segmenting position and a last candidate segmenting position of the same or higher hierarchy level, and then discarding the newly found candidate segmenting position if the size of the interval of data is lower than the minimum bound on the size of a block, or retaining the newly found candidate segmenting position if the size of the interval of data is not lower than the minimum bound on the size of a block or if there is no last candidate segmenting position of a same or higher hierarchy level as the newly found candidate segmenting position. In the latter case, when a last candidate segmenting position of a same or higher hierarchy level becomes available (e.g. in case of concurrent calculation units of segmenting positions), the evaluation is reiterated to converge the edge segmenting positions of the outputs of consecutive calculation units.

In one embodiment, the present invention retains the newly found candidate segmenting position if the size of the interval of data is not lower than the minimum bound on the size of a block, and/or retains the newly found candidate segmenting position if there is no last candidate segmenting position of a same or higher hierarchy level as the newly found candidate segmenting position.

In one embodiment, the present invention converges the outputs of concurrent calculation units of segmenting positions by: considering the edge segmenting positions of the outputs of two consecutive calculation units of segmenting positions, calculating the size of the interval of data between the first highest level segmenting position in the latter unit and the last highest level segmenting position in the previous unit, and discards the first highest level segmenting position in the latter unit and all the segmenting positions on the interval of data if the size of the interval of data is smaller than the minimum bound on the size of a block.

In one embodiment, the present invention retains the first highest level segmenting position in the latter unit if the size of the interval of data is not smaller than the minimum bound on the size of a block, discards the segmenting positions on the interval of data if the calculated size of the interval of data is not larger than the maximum bound on the size of a block, and/or retains the segmenting positions on the interval of data if the calculated size of the interval of data is larger than the maximum bound on the size of a block.

In one embodiment, the present invention merges the last block of the previous calculation unit into the first block of the latter calculation unit if the last block of the previous calculation unit is not ended by a segmentation position.

In one embodiment, the present invention provides a solution for segmenting data into variable size blocks based on content defined positions in a data deduplication system using a processor device in a computing environment. In one embodiment, by way of example only, the method defines segmenting probabilities and segmenting conditions are defined, and each of the segmenting conditions is associated with one of the plurality of segmenting probabilities. Each one of the segmenting conditions is ordered in accordance with an associated segmenting probabilities to form a hierarchy of the segmenting conditions. A segmenting condition associated with a highest segmenting probability defined to be a lowest level segmenting condition in the hierarchy of the segmenting conditions. The segmenting condition associated with a lowest segmenting probability defined to be a highest level segmenting condition in the hierarchy of the segmenting conditions. Hash values are calculated for each seed block in each consecutive byte position in data. Each one of the hash values are evaluated using the segmenting conditions. A segmenting position is determined in the data for each hash value that satisfies one of the segmenting conditions.

In one embodiment, the present invention defines that if a hash value satisfies one of the plurality of segmenting conditions, then that hash value also satisfies the segmenting conditions which are of lower level on the hierarchy than the one segmenting condition; and further defining that if a hash value does not satisfy one of the segmenting conditions, then that hash value also does not satisfy the segmenting conditions which are of higher level on the hierarchy than the one segmenting condition.

In one embodiment, the present invention evaluates each one of hash values with the segmenting conditions, in an evaluation order from the lowest level segmenting condition to the highest level segmenting condition. In one embodiment, the present invention stops the evaluation of a hash value at the first segmenting condition that is not satisfied by the hash value.

In one embodiment, the present invention determines for each one of the plurality of hash values the highest level segmenting condition that is satisfied by the hash value, determining the position of the hash value in the data to be a segmenting position, and assigning a hierarchy level to the segmenting position, which is the hierarchy level of the highest level segmenting condition that is satisfied by the hash value.

In one embodiment, the present invention performs at least one of defining the highest level segmenting condition to be of the form "([Hash value] modulo [Divisor])=[Residue]", and defining the rest of the segmenting conditions to be of the form "([Hash value] modulo [Divisor])<([Divisor]/[Target inverse probability])", and defining the highest level segmenting condition to be of the form "([Hash value] modulo [Divisor])=[Residue]", and defining the rest of the segmenting conditions to be of the form "([Hash value] modulo [Target inverse probability])=[Residue]".

In one embodiment, the present invention performs one of and/or all of defining the [Divisor] and the [Target inverse probabilities] to be power of 2 values, defining [Divisor]>[Target inverse probability]$_1$> . . . >[Target inverse probability]$_T$, where there are T target inverse probabilities; and defining [Residue]<MIN{[Divisor]/[Target inverse probability]$_{i=1 \ldots T}$} for the first type of conditions, and [Residue] <MIN{[Target inverse probability]$_{i=1 \ldots T}$} for the second type of conditions.

In one embodiment, the present invention defines the size of the seed block to be 64 bytes, the value of the Divisor to be 1024, and the Target inverse probabilities used in the lower level segmenting conditions to be 256, 128, and 64.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for applying a content defined maximum size bound on content defined segmentation of data into blocks using a processor device in a computing environment, comprising:

defining a plurality of segmenting probabilities and a plurality of segmenting conditions;

ordering the plurality of segmenting conditions in accordance with the associated one of the plurality of segmenting probabilities to form a hierarchy of the plurality of segmenting conditions;

defining a segmenting condition associated with a highest segmenting probability to be a lowest level segmenting condition in the hierarchy of the plurality of segmenting conditions, and defining the segmenting condition associated with a lowest segmenting probability to be a highest level segmenting condition in the hierarchy of the plurality of segmenting conditions;

defining a maximum bound on a size of a block;
calculating a plurality of hash values for each seed block in each consecutive byte position in the data;
evaluating each one of the plurality of hash values using the plurality of segmenting conditions;
determining a position of one of the plurality of hash values as a candidate segmenting position in the data if at least one of the plurality of segmenting conditions is satisfied by the hash value;
defining a hierarchy level of a candidate segmenting position as the hierarchy level of the highest level segmenting condition that is satisfied by the one of the plurality of hash values of the candidate segmenting position; and
recording candidate segmenting positions with hierarchy levels of the candidate segmenting positions.

2. The method of claim 1, wherein each of the plurality of segmenting conditions is associated with one of the plurality of segmenting probabilities, and further including performing:
calculating the size of the interval of data between a newly found candidate segmenting position and a previous candidate segmenting position;
determining the candidate segmenting positions of the interval of data to be actual segmenting positions if the size of the interval of data exceeds the maximum bound on the size of the block; and
defining the previous candidate segmenting position to be a candidate segmenting position of one of a same hierarchy level and higher hierarchy level as a newly found candidate segmenting position.

3. The method of claim 2, further including defining the candidate segmenting positions of the interval of data to be of a lower hierarchy level than the newly found candidate segmenting position.

4. The method of claim 2, further including maintaining for each level of hierarchy a last candidate segmenting position of one of the same hierarchy level and the higher hierarchy level.

5. The method of claim 1, further including discarding candidate segmenting positions of the interval of data if the size of the interval of data does not exceed the maximum bound on the size of the block.

6. The method of claim 1, further including applying segmentation of the interval of data to blocks of a predefined size, if the size of the interval of data exceeds the maximum bound on the size of the block and there are no candidate segmenting positions of the interval of data.

7. The method of claim 1, further including defining the maximum bound on the size of the block based on the lowest segmenting probability.

8. The method of claim 1, further including performing one of:
defining that if one of the hash values satisfies one of the plurality of segmenting conditions, then the one of the hash values also satisfies the plurality of segmenting conditions which are of a lower level in the hierarchy of the plurality of segmenting conditions than the one of the plurality of segmenting conditions, and
defining that if one of the hash values does not satisfy one of the plurality of segmenting conditions, then the one of the hash values also does not satisfy the plurality of segmenting conditions which are of a higher level in the hierarchy of the plurality of segmenting conditions than the one of the plurality of segmenting conditions.

9. A system for applying a content defined maximum size bound on content defined blocks of a computing environment, the system comprising:
a repository operating in the computing environment;
a memory in association with the repository; and
at least one processor device operable in the computing storage environment for controlling the data deduplication system and in communication with the repository and the memory, wherein the at least one processor device:
defines a plurality of segmenting probabilities and a plurality of segmenting conditions,
orders the plurality of segmenting conditions in accordance with the associated one of the plurality of segmenting probabilities to form a hierarchy of the plurality of segmenting conditions,
defines a segmenting condition associated with a highest segmenting probability to be a lowest level segmenting condition in the hierarchy of the plurality of segmenting conditions, and defining the segmenting condition associated with a lowest segmenting probability to be a highest level segmenting condition in the hierarchy of the plurality of segmenting conditions,
defines a maximum bound on a size of a block,
calculates a plurality of hash values for each seed block in each consecutive byte position in data,
evaluates each one of the plurality of hash values using the plurality of segmenting conditions,
determines a position of one of the plurality of hash values as a candidate segmenting position in the data if at least one of the plurality of segmenting conditions is satisfied by the hash value,
defines a hierarchy level of a candidate segmenting position as the hierarchy level of the highest level segmenting condition that is satisfied by the one of the plurality of hash values of the candidate segmenting position, and
records candidate segmenting positions with hierarchy levels of the candidate segmenting positions.

10. The system of claim 9, wherein each of the plurality of segmenting conditions is associated with one of the plurality of segmenting probabilities, and wherein the at least one processor device:
calculates the size of the interval of data between a newly found candidate segmenting position and a previous candidate segmenting position,
determines the candidate segmenting positions of the interval of data to be actual segmenting positions if the size of the interval of data exceeds the maximum bound on the size of the block, and
defines the previous candidate segmenting position to be a candidate segmenting position of one of a same hierarchy level and higher hierarchy level as a newly found candidate segmenting position.

11. The system of claim 10, wherein the at least one processor device defines the candidate segmenting positions of the interval of data to be of a lower hierarchy level than the newly found candidate segmenting position.

12. The system of claim 10, wherein the at least one processor device maintains for each level of hierarchy a last candidate segmenting position of one of the same hierarchy level and the higher hierarchy level.

13. The system of claim 9, wherein the at least one processor device discards candidate segmenting positions of the interval of data if the size of the interval of data does not exceed the maximum bound on the size of the block.

14. The system of claim 9, wherein the at least one processor device applies segmentation of the interval of data to blocks of a predefined size, if the size of the interval of data exceeds the maximum bound on the size of the block and there are no candidate segmenting positions of the interval of data.

15. The system of claim 9, wherein the at least one processor performs one of:
defining the maximum bound on the size of the block based on the lowest segmenting probability,
defining that if one of the hash values satisfies one of the plurality of segmenting conditions then the one of the hash value also satisfies the plurality of segmenting conditions which are of a lower level segmenting condition in the hierarchy of the plurality of segmenting conditions than the one of the plurality of segmenting conditions, and
defining that if one of the hash values does not satisfy one of the plurality of segmenting conditions, then the one of the hash values also does not satisfy those of the plurality of segmenting conditions which are of a higher level segmenting condition in the hierarchy of the plurality of segmenting conditions.

16. A computer program product for applying a content defined maximum size bound on content defined blocks using a processor device in a computing environment, the computer program product comprising a non-transitory computer-readable storage medium having computer-readable program code portions stored therein, the computer-readable program code portions comprising:
an executable portion that defines a plurality of segmenting probabilities and a plurality of segmenting conditions;
an executable portion that orders the plurality of segmenting conditions in accordance with the associated one of the plurality of segmenting probabilities to form a hierarchy of the plurality of segmenting conditions;
an executable portion that defines a segmenting condition associated with a highest segmenting probability to be a lowest level segmenting condition in the hierarchy of the plurality of segmenting conditions, and defining the segmenting condition associated with a lowest segmenting probability to be a highest level segmenting condition in the hierarchy of the plurality of segmenting conditions;
an executable portion that defines a maximum bound on a size of a block;
an executable portion that calculates a plurality of hash values for each seed block in each consecutive byte position in data;
an executable portion that evaluates each one of the plurality of hash values using the plurality of segmenting conditions;
an executable portion that determines a position of one of the plurality of hash values as a candidate segmenting position in the data if at least one of the plurality of segmenting conditions is satisfied by the hash value;
an executable portion that defines a hierarchy level of a candidate segmenting position as the hierarchy level of the highest level segmenting condition that is satisfied by the one of the plurality of hash values of the candidate segmenting position; and
an executable portion that records candidate segmenting positions with hierarchy levels of the candidate segmenting positions.

17. The computer program product of claim 16, wherein each of the plurality of segmenting conditions is associated with one of the plurality of segmenting probabilities, and further including:
an executable portion that calculates the size of the interval of data between a newly found candidate segmenting position and a previous candidate segmenting position;
an executable portion that determines the candidate segmenting positions of the interval of data to be actual segmenting positions if the size of the interval of data exceeds the maximum bound on the size of the block; and
an executable portion that defines the previous candidate segmenting position to be a candidate segmenting position of one of a same hierarchy level and higher hierarchy level as a newly found candidate segmenting position.

18. The computer program product of claim 17, further including an executable portion that defines the candidate segmenting positions of the interval of data to be of a lower hierarchy level than the newly found candidate segmenting position.

19. The computer program product of claim 17, further including an executable portion that maintains for each level of hierarchy a last candidate segmenting position of one of the same hierarchy level and the higher hierarchy level.

20. The computer program product of claim 17, further including an executable portion that applies segmentation of the interval of data to blocks of a predefined size, if the size of the interval of data exceeds the maximum bound on the size of the block and there are no candidate segmenting positions of the interval of data.

21. The computer program product of claim 17, further including an executable portion that performs one of:
defining the maximum bound on the size of the block based on the lowest segmenting probability,
defining that if one of the hash values satisfies one of the plurality of segmenting conditions then the one of the hash value also satisfies the plurality of segmenting conditions which are of a lower level segmenting condition in the hierarchy of the plurality of segmenting conditions than the one of the plurality of segmenting conditions, and
defining that if one of the hash values does not satisfy one of the plurality of segmenting conditions, then the one of the hash values also does not satisfy those of the plurality of segmenting conditions which are of a higher level segmenting condition in the hierarchy of the plurality of segmenting conditions.

22. The computer program product of claim 16, further including an executable portion that discards candidate segmenting positions of the interval of data if the size of the interval of data does not exceed the maximum bound on the size of the block.

* * * * *